United States Patent [19]  [11] 4,134,941
Hrovat et al.  [45] Jan. 16, 1979

[54] SPHERICAL FUEL ELEMENTS MADE OF GRAPHITE FOR TEMPERATURE REACTORS AND PROCESS FOR REWORKING IT AFTER THE IRRADIATION

[75] Inventors: Milan Hrovat; Hans-Joachim Becker, both of Rodenbach; Hans Huschka, Hanau, all of Germany

[73] Assignee: HOBEG Hochtemperaturreaktor-Brennelement GmbH, Hanau, Germany

[21] Appl. No.: 753,098

[22] Filed: Dec. 21, 1976

Related U.S. Application Data

[62] Division of Ser. No. 531,743, Dec. 11, 1974, Pat. No. 4,022,663.

[30] Foreign Application Priority Data

Dec. 14, 1973 [DE] Fed. Rep. of Germany ....... 2362088

[51] Int. Cl.² ...................... G21C 21/00; G21C 21/02
[52] U.S. Cl. .............................. 264/0.5; 252/301.1 W
[58] Field of Search ..................... 176/40, 68; 264/0.5; 252/301.1 W

[56] References Cited

U.S. PATENT DOCUMENTS

| B 428,386 | 4/1976 | Kamiya et al. | 252/301.1 W |
| 2,852,460 | 9/1958 | Abbott et al. | 176/82 X |
| 3,267,001 | 8/1966 | Greebler | 176/67 |
| 3,413,195 | 11/1968 | Boettcher | 176/91 SP |
| 3,580,705 | 5/1971 | Coleman et al. | 252/301.1 W X |
| 3,669,832 | 6/1972 | Boettcher | 176/91 SP X |
| 3,878,041 | 4/1975 | Leitnaker et al. | 176/91 SP X |
| 3,907,948 | 9/1975 | Gyarmati et al. | 264/0.5 |
| 3,945,884 | 3/1976 | Freck | 264/0.5 X |
| 3,975,471 | 8/1976 | Hrovat et al. | 264/0.5 |

Primary Examiner—Peter A. Nelson
Attorney, Agent, or Firm—Cushman, Darby & Cushman

[57] ABSTRACT

There are provided pressed spherical fuel elements for high temperature reactors made of a graphite matrix with separate embedded coated fuel and fertile material particles wherein the fuel elements comprise 3 concentric layers including a graphite nucleus or core (1) which only contains fertile material particles (4), this graphite nucleus (1) is surrounded by a graphite zone (2) which only contains the fuel particles (5) and this is encased in a shell (3) of pure graphite, the same graphite material being present in all three layers.

11 Claims, 3 Drawing Figures

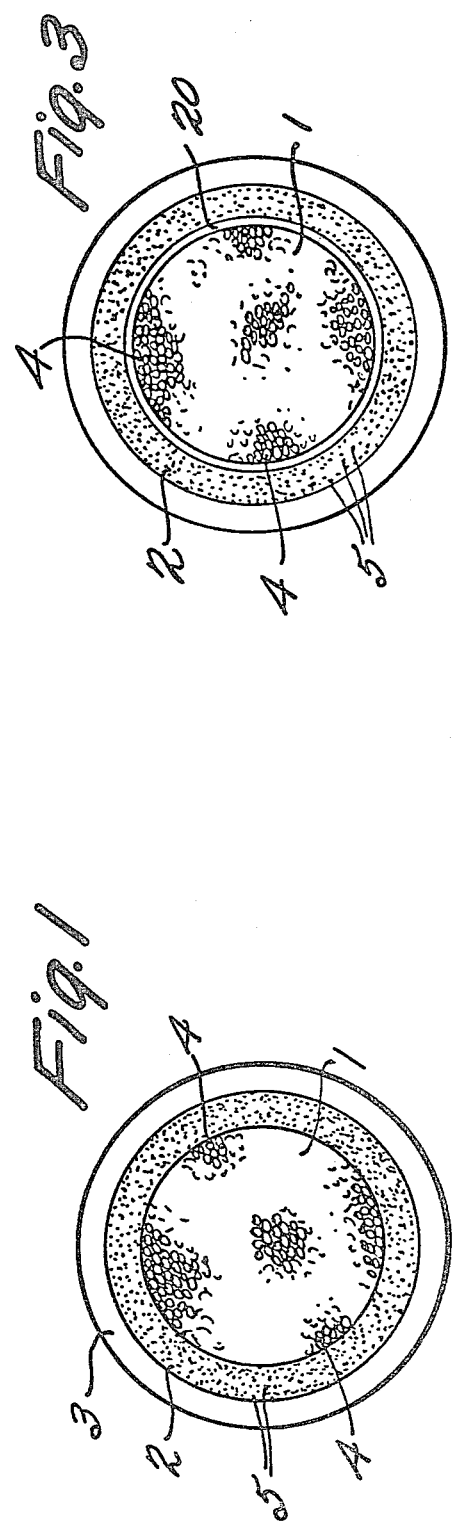
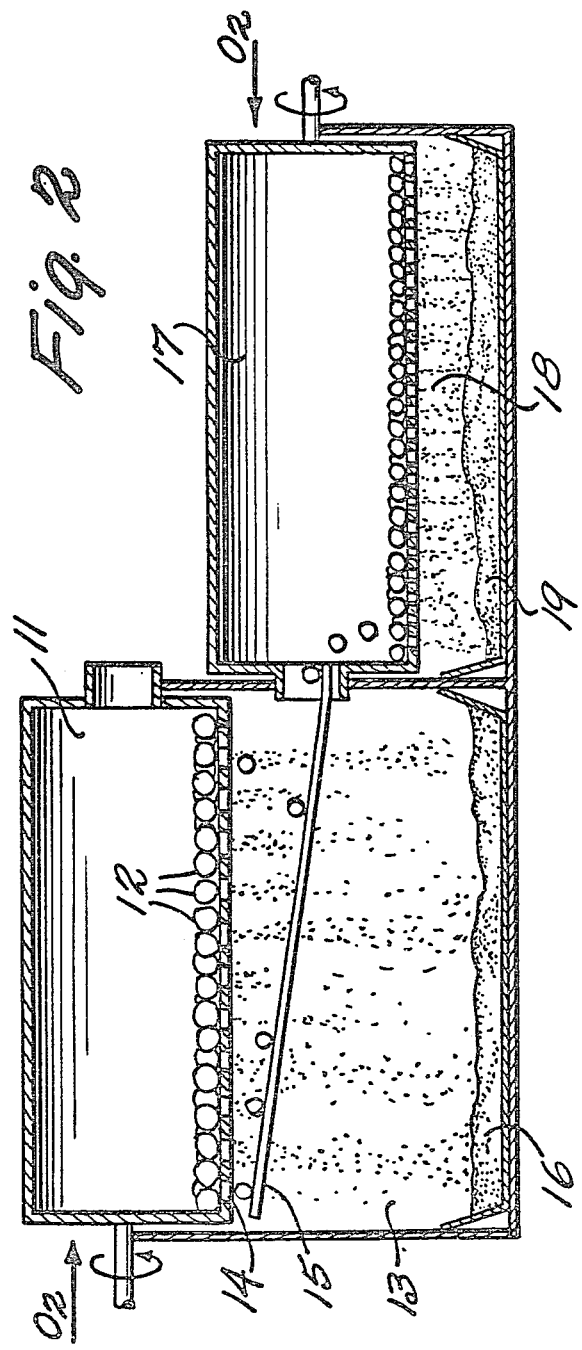

SPHERICAL FUEL ELEMENTS MADE OF GRAPHITE FOR TEMPERATURE REACTORS AND PROCESS FOR REWORKING IT AFTER THE IRRADIATION

This is a division of application Ser. No. 531,743 filed Dec. 11, 1974, now U.S. Pat. No. 4,022,633.

The invention concerns a new type of pressed spherical fuel element made of graphite for high temperature reactors consisting of a graphite nucleus (or core) containing only fertile (breeder) particles, a graphite shell containing only fuel particles and a further outer shell of pure graphite and an especially advantageous process for reprocessing this fuel element after the irradiation in the reactor. The three layers of the fuel element are concentric.

Spherical graphite fuel elements are necessary for gas cooled high temperature reactors. They usually consist of a fuel and fertile material containing spherical nucleus which is surrounded by a fuel free shell (Hrovat German Offenlegungsschrift 1,646,783). The graphite matrix, i.e., the graphite material of the nucleus and shell is identical. The fuel element diameter generally is 60 mm and the thickness of the shell 5 mm.

In the known spherical graphite fuel elements the spherical nucleus contains in homogeneous distribution the fuel or fertile material in the form of spherical particles. To retain fission products the particles are surrounded by a multiple layer of pyrolytic carbon, in a given case with an intermediate layer of silicon carbide.

There is added as fuel Uranium 235 and as fertile material Thorium 232 in the form of the carbide or oxide. Thereby in the so-called THTR-element, the standard spherical fuel element of the thorium high temperature reactor, fuel and fertile material jointly are provided for in the same particles, in the so-called feed-breed-element, however, they are separated in discrete particles which are distributed mixed together in the nucleus of the sphere.

In the uranium-thorium cycle there is sought to be obtained from the thorium the especially valuable Uranium 233 in as pure as possible condition and without being admixed with other uranium isotopes because of its high fission neutron yield.

For this reason there has been tried the separation from each other of the fuel and fertile material particles in the reprocessing of the irradiated fuel elements. As the best suited process for reprocessing graphite HTR-fuel elements there has proven conbustion (Atomwirtschaft Vol. 18 (1973) page 294 and Kerntechnik Vol. 15 (1973) page 249.)

According to the state of the art today there cannot be satisfactorily attained a separation of fuel and fertile material.

The processes which depend upon a sieve separation of the smaller fuel particles from the larger fertile material particles after burning off of the pyrolytic carbon coatings still have the danger of a contact contamination of the different particles with each other. Furthermore a part of the material is lost for the separation because weakened by the burning off and irradiation are broken.

Also the possibility of protecting one of the types of particle (preferably the burned off particles) by an unburnable SiC intermediate layer still includes a number of disadvantages, namely, the increase in expense of fabricating the fuel element through additional coating costs, the deterioration of the neutron economy in the reactor, the danger of the Uranium 233 contamination with Uranium 235 in the particle breaking and the increase of the radioactive waste.

Especially there cannot be avoided in the burning that a part of the irradiation weakened, SiC-coated particles disintegrate after burning off the outer pyrolytic carbon layer and thereby there occurs a mixing of Uranium 235 and Uranium 233.

These disadvantages are avoided by the spherical fuel element of the invention which is characterized by a nucleus (core) which only contains fertile material particles, surrounded by a graphite zone which only contains fuel particles and an outer shell of pure graphite.

The invention will be understood best in connection with the drawings wherein;

FIG. 1 is a schematic sectional view of a fuel element according to the invention;

FIG. 2 is a cross section of a revolving cylindrical furnace used to carry out the process of the invention; and, FIG. 3 is a view similar to FIG. 1 showing another fuel element according to the invention.

Referring more specifically to FIG. 1 of the drawings there is shown schematically an exemplary illustrative form of the spherically shaped fuel element of the invention. A graphite nucleus 1 which only contains fertile material particles 4 is surrounded on all sides by a graphite zone 2 which contains only fuel particles 5 and a further outer shell 3 of pure graphite. As pointed out above the three layers are concentric.

For example the nucleus 1 had a diameter of 40 mm and both shells 2 and 3 have thickness of 5 mm so that the diameter of the spherical fuel element in this case is 60 mm. The diameter of the three layers and of the overall sphere can be varied, e.g., the nucleus 1 can have a diameter of 25 to 60 mm, the graphite zone 2 a thickness of 3 to 15 mm and the outer shell 3 a thickness of 2 to 10 mm and the diameter of the overall sphere can be 50 to 75 mm.

The same graphite material is always employed in the three zones (1, 2 and 3).

Essentially the fuel material zone is separately arranged from the fertile material zone in the nucleus of the sphere, the fuel material zone surrounding this nucleus as a shell. All three zones are joined together without transition.

This spatially separated arrangement of the fuel material zone from the fertile material zone of the invention permits in the so-called Head-End process, the first process step for reworking the fuel element, a simple separation of the uranium containing particles from the thorium containing coated particle after the irradiation in the reactor.

A good irradiation behavior of the fuel element, especially the possibility of retaining gaseous and solid fission products takes for granted the lowest possible fuel temperature in the center of the sphere.

This temperature is fixed at a fixed surface temperature by the temperature gradient in the shpere. The temperature gradient depends on the fuel element output, the heat conductivity of the graphite matrix and the geometric arrangement of the heat producing zone. While the fuel element output is fixed by the criteria of construction chosen for the reactor core and the heat conductivity of a material is constant a reduction of the fuel temperature in the nucleus of the sphere in general can only be produced through suitable arrangement of the fuel or fertile material zone.

In order to shorten the heat path to the outside therefore, the uranium containing fuel zone is arranged outside the center of the sphere.

In the first half of the insertion time of a fuel element sphere nearly the entire heat production takes place by the fission of Uranium 235; therewith the fuel element output is chiefly carried by the fuel material zone.

In the same measure as the Uranium 235 burns down and the Uranium 233 is bred from the Thorium 232, the heat production is displaced inside the sphere to the fertile material zone. This displacement of the heat production from the fuel material zone into the fertile material zone is accompanied by a strong reduction in the total fuel element output, so that only a relatively low temperature gradient is maintained in the sphere.

The fuel element construction of the invention with separated arrangement of fuel and fertile zones in the nucleus and a surrounding shell makes possible, in contrast to the known fuel elements, a considerable lowering of the temperature gradient in the shpere, whereby both the ability to retain fission products is improved and also the thermal and connected therewith the irradiation induced mechanical stresses in the fuel element are reduced.

Thereby the mechanical stability of the sphere is further increased during the entire residence time in the reaction.

It has proven favorable, if the common interval between the coated fuel particles 5 embedded in the graphite matrix of the zone 2 is greater by a factor of 1.2 to 2.5 than the interval between the coated fertile material particles 4 embedded in the graphite matrix of the nucleus 1 of the sphere, which latter interval should be at least 100-200 $\mu$m. This is true for both the average interval of the coated fuel or fertile material particles in zone 2 or in the nucleus 1 and for the thickness of the encasing layers through which in the pressing of the sphere the interval is limited this minimal interval occuring for two encased coated particles.

In order to increase the retention of gaseous and solid fission products the fuel particles besides being coated with pyrolytic carbon preferably additionally are coated with an intermediate layer of SiC. In pressing the spheres there is the danger that at too thin an encasing a spot loading of coated particles occurs as the result of a local graphite matrix formation which leads to damage to the brittle SiC coating layers while the pyrolytic carbon coating layer on the fertile particles without SiC are considerably more elastic and still not damaging.

The greater distance between the fuel particles compared to the fertile particles has the advantage that the relatively thick encasing layer of graphite matrix powder guarantees that the brittle silicon carbide layers of the fuel particle are not damaged in the pressing.

An especial advantage of the separate arrangement of fuel and fertile material according to the invention is that a simple separation of the uranium containing particles from the thorium containing particles is offered in the Head-End stage of the reprocessing of the fuel elements after the irradiation in the reactor. In the Head-End stage the burned down fuel elements are subjected to a burning process in oxygen at about 1000 to 1200° C. In this process the graphite structural material is burned off, whereby the fertile and fuel particles become exposed. In order to make possible a uniform burning off of the surface of the sphere it is advantageous to burn the spheres in a rotating cylindrical furnace as shown in FIG. 2. According to the invention the burning of the spherically shaped fuel elements takes place in two steps. In the first step the spheres of for example 60 mm diameter to 40 mm diameter are burned off and thereby only the uranium containing fuel particles are exposed. In the second step there takes place the burning of the nucleus of the sphere and the recovery of the thorium containing fertile material particles.

In a given case between the fuel zone 2 and fertile material zone 1 there can be arranged a thin intermediate layer, for example 1-2 mm thick of pure graphite matrix, as for example the layer 20 in FIG. 3, so that in the burning off of the spheres a complete separation of fuel and fertile particles is guaranteed.

In a rotating cylindrical furnace 11 both outer graphite layers of the spherical fuel elements 12 having a diameter of 60 mm are burned off with air oxygen whereby the fuel particles 13 can fall through the perforated furnace wall 14 (perforations 40 mm in diameter) and a grate 15 found thereunder and provided with holes 5 mm in diameter. They are caught in a container 16. If both outer graphite layers of the fuel elements 12 are burned off and the spheres therewith shrunk to a diameter of 40 mm, the spheres fall through the furnace wall 14 on the downwardly sloping grate 15 and into a second rotating cylindrical furnace 17 where the residual graphite matrix is burned off. From here the fertile material particles 18 fall into a container 19.

It has been found especially advantageous to make a varient of the three zone elements of the invention in which the fuel containing graphite zone 2 has a smaller strength than the shell 3 and the fertile material containing nucleus 1. This can be attained in the production of the fuel elements by not using as pressing material for the pressing of the fuel zone onto the nucleus a mixture of encased coated fuel particles and graphite molding powder but instead using a charge of thickly encased coated fuel particles without addition of molding powder as prepared according to Hrovat German Pat. No. 1,909,871, the entire disclosure of which is incorporated herein and relied upon.

When a three zoned fuel element which has mechanically weaker zone is crushed, the outer shell and fuel zone spall off smoothly from the fertile material containing nucleus without damaging the nucleus. The strength of such a three zoned fuel element, however, is still sufficient for use in a spherical pile reactor in which according to more modern construction the fuel elements are only passed through once during their time of insertion and through constructive precautions the mechanical load by the reactor-control rods inserted directly into the bed of spheres in the reactor core is sufficiently limited.

The purpose of the production of three zoned fuel elements with lower mechanical strength of the fuel zone is to make the reworking according to the process of the invention still simpler and safer The fuel elements after insertion in the reactor become crushed and the spalled off parts, which arise from the shell and the fuel zone can be burned separately from the fertile material containing nucleus. Through this a still more certain separation between fertile material and fuel material is produced. The distribution after the crushing for example can take place either through taking out the nucleus of the sphere or through sieve separation. The crushing of the radioactive fuel elements after their insertion in the reactor and the separation of the spalled off parts from the nucleus of the sphere as well as the separate burning is undertaken in a so-called hot cell in remote operation.

In the production of three zoned elements according to the invention with a mechanically weaker fuel zone the strength of the fuel zone and therewith of the fuel element can be influenced by various modes of action and thereby be adapted according to the different requirements which are set by the reactor or the reprocessing. On the one hand by changing the individual molding pressures in the preliminary pressing steps for the nucleus and zone there can be influenced the adhesion between nucleus and zone and the strength of these regions, on the other hand in a given case the strength of the zone and of the fuel element can be increased if only a small amount of molding powder is added in the pressing of the zone.

The invention will be further illustrated by the following examples showing the production of spherically shaped fuel elements.

Unless otherwise indicated all parts and percentages are by weight.

EXAMPLE 1

As fuel particles there were employed spherically shaped kernels of $UO_2$ having a diameter of $210\mu m$. These particles were twice provided with pyrolytically deposited carbon layers having a total thickness of $160\mu m$. The coated particles with a diameter of $560\mu m$ and a density of 2.2 $g/cm^3$ contained 23 weight % uranium.

The fertile material particles ($ThO_2$) having a kernel diameter of $617\mu m$ were likewise double coated with pyrolytically deposited carbon layers having a total thickness of $160\mu m$. The coated particles having a diameter of $905\mu m$ and a density of 3.99 $g/cm^3$ contained 63 weight % thorium.

As graphite molding powder there was employed a mixture consisting of 64 weight % natural graphite, 16% of graphitized petroleum coke and 20% novolak (phenolformaldehyde) resin binder.

The fuel and fertile material particles were encased with the graphite molding powder in separate operations with addition of methanol in a rotating drum. The amounts set were so chosen that there was formed on the fertile material particles an encasing layer of $160\mu m$ and on the fuel material particles an encasing layer having a thickness of $240\mu m$.

For the production of the spherical nuclei 48 grams of the encased coated fertile material particles together with 30 grams of graphite molding powder of the type set forth above were transferred into a rubber mold, mixed thoroughly and preliminarily pressed into a spherical nucleus at a pressure of 50 $kg/cm^2$.

In a second operation this nucleus was arranged in a second rubber mold with the help of three interval spacers in the center of the mold and the rest of the volume of the rubber mold filled with a mixture consisting of 41 grams of encased coated fuel particles and 20 grams of graphite molding powder. After that the compression took place at a pressure of 80 $kg/cm^2$.

Subsequently these preliminarily pressed spheres were provided according to a process known itself and described in Hrovat German Offenlegungsschrift No. 1,646,783 (the entire disclosure of which is hereby incorporated by reference and relied upon), with a shell of the same graphite molding powder and finally molded under high pressure (3 metric tons/$cm^2$).

The spheres were heated to 800° C. for 18 hours to carbonize the binder resin and after the cooling roasted in a further operation at 1800° C.

After the final temperature treatment the spheres were turned to the predetermined diameter (6 cm).

The finished element contained 18 grams of thorium in the 40 mm diameter nucleus of the shpere and 2 grams of uranium in the 5mm thick fuel zone.

The measured breaking load through crushing between two parallel steel plates amounted to 2300 kp.

EXAMPLE 2

The production of fertile material containing nucleus and total graphite molding powder took place in the same way as in Example 1.

As fuel particles there were used $UO_2$ kernels having a diameter of $210\mu m$ which were provided with pyrolytically deposited multiple carbon layers and with an intermediate silicon carbide layer. The coated particles having an average diameter of $560\mu m$ and a density of 2.33 $g/cm^3$ contained 20.9 weight 7 of uranium.

These fuel particles were encased with graphite molding powder as in Example 1 and has an encasing layer having a thickness of $310\mu m$.

In pressing the fuel zone on the preliminarily pressed fertile material containing nucleus of the sphere two rubber molds prepared as in Example 1 were filled with 60 grams of encased coated fuel particles without the addition of molding powder, after which compression was carried out at a pressure of 80 $kp/cm^2$.

The subsequent process steps and the sphere dimensions obtained and uranium/thorium content were the sme as in Example 1.

The breaking load of the fuel elements produced amounted to 1800 kp. In crushing the outer shell and the fuel zone spalled off from the unchanged nucleus in many pieces.

When a thin pure graphite layer is provided between the fertile material zone and the fuel zone it is generally 0.5 to 3 mm thick.

The process of making the fuel elements can comprise, consist of or consist essentially of the aforementioned steps as can the method of reworking the spheres after use. Likewise the fuel elements can comprise, consist of or consist essentially of the stated layers.

We claim:

1. A process for reprocessing a spherically shaped fuel element for high temperature reactors consisting of a graphite matrix having enbedded separately therein coated fuel and fertile material particles, said fuel element having a solid spherical nucleus containing only fertile material particles encased by graphite, a zone including the same type of graphite containing only fuel material particles encased by said graphite and concentrically surrounding both said nucleus and said fuel material particle containing zone with a concentric pure graphite shell of the same type of graphite as that in both said fertile material containing nucleus and said fuel material particle containing zone comprising burning the graphite matrix in the Head-End stage of the reprocessing in two steps in which the first step comprises burning off the graphite of the shell and the fuel containing zone and the second step comprises burning off the graphite of the fertile material containing nucleus.

2. A process according to claim 1 wherein the fertile material is thorium oxide or thorium carbide and the fuel material is uranium oxide or uranium carbide.

3. A process according to claim 1 wherein in the fuel element the outer boundary of the fertile containing nucleus is contiguous with the inner boundary of the fuel containing zone.

4. A process according to claim 2 wherein the fuel containing zone has a lower crushing strength than the fertile material containing nucleus and the graphite shell.

5. A process according to claim 1 wherein the fuel containing zone has a lower crushing strength than the fertile material containing nucleus and the graphite shell.

6. A process according to claim 1 wherein there is present a thin pure graphite matric layer between the fertile material containing nucleus and the fuel containing zone.

7. A process according to claim 1 wherein the burning in both steps is in air at 1000–1200° C.

8. The process of claim 7 wherein the shell and the fuel containing graphite zone are mechanically separated from the sphere by the application of pressure and then the resultant broken pieces of the fuel containing graphite zone and the shell have the graphite burned off separately from the fertile material containing nucleus.

9. The process of claim 8 wherein the fuel containing zone of the fuel element has a lower strength than the fertile material containing nucleus to facilitate said mechanical separation.

10. The process of claim 7 comprising burning off the graphite of the shell and the fuel containing zone is a first rotating furnace having an apertured wall therein, the apertures in said wall being smaller than the size of said fuel element sphere but larger than said nucleus, allowing the nuclei to fall through said apertures, retaining said fallen nuclei on a perforated surface, the perforations of said surface being smaller than said nuclei but larger than the particles of fuel and allowing the fuel particles to pass through the perforations in said surface.

11. The process of claim 10 comprising conveying the fallen nuclei to a second rotating furnace, having an aperture wall, the apertures in the wall of said second furnace being smaller than said nuceli but larger than said fertile material particles, burning off the graphite of the fertile material containing nucleus and allowing the particles of fertile material to fall through said aperture wall of the second furnace.

* * * * *